United States Patent [19]
Helstab et al.

[11] Patent Number: 6,073,031
[45] Date of Patent: Jun. 6, 2000

[54] DESKTOP DOCKING STATION FOR USE WITH A WIRELESS TELEPHONE HANDSET

[75] Inventors: Edmond J. Helstab; Jeffrey L. Fairless, both of Kanata; Michael C. G. Lee, Ottawa; Neal T. Cowan, Ottawa; Jonathan Crone, Ottawa; Edward L. Pugh, Richmond; Robert E. Bradley, Ottawa, all of Canada

[73] Assignee: Nortel Networks Corporation, Montreal, Canada

[21] Appl. No.: 08/997,984

[22] Filed: Dec. 24, 1997

[51] Int. Cl.⁷ ........................................ H04B 1/38
[52] U.S. Cl. .................... 455/557; 455/569; 455/572; 455/575; 455/561; 455/418
[58] Field of Search .................... 455/74.1, 556, 455/557, 575, 90, 572, 561, 569, 573, 418, 419, 420, 351; 379/56.3

[56] References Cited

U.S. PATENT DOCUMENTS

| | | | |
|---|---|---|---|
| 5,333,176 | 7/1994 | Burke et al. | 455/573 |
| 5,446,783 | 8/1995 | May | 455/557 |
| 5,526,402 | 6/1996 | Dent et al. | 455/74.1 |
| 5,625,673 | 4/1997 | Grewe et al. | 455/556 |
| 5,752,195 | 5/1998 | Tsuji et al. | 455/462 |
| 5,754,625 | 5/1998 | Shimura | 455/573 |
| 5,802,460 | 9/1998 | Parvulescu | 455/92 |
| 5,870,680 | 2/1999 | Guerlin et al. | 455/557 |
| 5,884,190 | 3/1999 | Lintula et al. | 455/557 |

*Primary Examiner*—Nguyen Vo
*Assistant Examiner*—Duc Nguyen
*Attorney, Agent, or Firm*—Jean-Pierre Fortin; Dallas F. Smith

[57] ABSTRACT

A telephone base unit for use with a mobile telephone handset comprises means for interfacing the handset with the base unit for enabling user definable data entry key settings of the handset to be downloaded and emulated at the base unit such that when interfaced with the base unit, the mobile telephone handset operates to enable the use of the base unit as a wireless desktop interface. The interface means is comprised of means for transferring user definable data entry key settings of the handset to the base unit, means for storing the user definable data entry key settings of the handset at said base unit and controller means to enable a user to use the user definable data entry key settings with the user interface of the base unit to receive incoming and make outgoing calls from the base unit via the mobile telephone handset.

22 Claims, 5 Drawing Sheets

DESKTOP DOCKING STATION FOR USE WITH A WIRELESS TELEPHONE HANDSET

FIELD OF THE INVENTION

This invention relates to telephone docking stations and is particularly concerned with a desktop telephone docking station for use with a wireless handset.

BACKGROUND OF THE INVENTION

Cordless telephones are known to offer great mobility. A cordless telephone comprises a base unit and a handset, wherein the handset connects to the telephone network via the base unit.

In order to make wireless telephones appear seamless, some cellular telephones have been designed to operate in a dual mode wherein they operate on a standard cellular protocol when out of range of a base unit and operate as a cordless handset via a base unit when within range of the base unit.

When used with its base unit, the dual mode cellular handset communicates with the telephone network via the base unit. That is, the dual mode handset communicates with the base unit via an RF link and then with the telephone network via a standard copper wire pair from the base unit to a central office (CO) or a small business switch such as a PBX. Otherwise, when away and out of range of the base unit, the handset operates as a regular cellular telephone, wherein the user accesses the telephone network via the cellular network infrastructure.

In both of these cases, the base unit can be used as a desktop charger. It may also be provided with a keypad to enable the user to dial out or answer via the wireline network.

One problem with these cordless telephones prior art is that the base unit must be physically connected to the telephone network. That is, while the user has the advantages associated with portability, the base unit must still be connected to a central office.

With dual-mode cellular telephones, while the user has the advantages of the portability of a cellular handset when operating the handset on a standard cellular protocol, a disadvantage remains in that the base unit still requires connection to a wireline network central office. Hence, the physical convenience that these dual mode telephones introduce is limited. Also missing is the usual cost savings on physical line connections that is usually related with a standard cellular phone.

Another problem with these dual-mode telephones is that the cordless handset is only compatible with one particular base unit. This lack of flexibility means that the user of a particular handset must return to its particular base unit when wishing to communicate in a cordless mode. Furthermore, when, for example, the dual mode telephone is utilized in a work environment, there is time and expense involved each and every time an employee changes his or her office location and must accordingly have his or her telephone number follow.

Therefore a need exists for a telephone system which overcomes the aforementioned problems.

SUMMARY OF THE INVENTION

An object of the present invention is to provide an improved desktop telephone docking station for use with a wireless handset.

Another object of the invention is to provide a desktop telephone docking station for use with a wireless handset which offers the flexibility of personal mobility along with the added features of a desktop telephone.

Yet another object of the invention is to provide a desktop telephone docking station which can emulate a handset's user definable input keys when interfacing with said handset.

Yet another object of the invention is to provide a desktop telephone docking station which operates to communicate with a telephone network via the handset's wireless interface protocol.

It is another object of the invention to provide a desktop telephone docking station which can detect the presence of a handset at the base unit.

In accordance with an aspect of the present invention there is provided a telephone base unit for use with a mobile telephone handset, said telephone base unit having a user interface with data entry keys, said base unit comprising:

means for interfacing said handset with said base unit for enabling user definable data entry key settings of said handset to be downloaded and emulated at said base unit such that when interfaced with said base unit, said mobile telephone handset operates to enable the use of said base unit as a wireless desktop interface.

In accordance with another aspect of the present invention there is provided a telephone base unit for use with a mobile telephone handset, wherein said mobile telephone handset operates to enable the use of said base unit as a wireless desktop interface when said mobile telephone handset interfaces with said base unit, comprising means for detecting the presence of a handset at said base unit and means for interfacing said handset at said base unit such that user definable data entry keys of said handset can be emulated at said base unit.

In accordance with another aspect of the present invention there is provided a telephone apparatus comprising a base unit and a mobile telephone handset, wherein said mobile telephone handset operates to enable the use of said base unit as a wireless desktop interface when said mobile telephone handset interfaces with said base unit and said base unit comprises means for detecting the presence of a handset at said base unit and means for interfacing said handset at said base unit such that user definable data entry keys of said handset can be emulated at said base unit.

In accordance with a further aspect of the invention, there is provided a method of interfacing a telephone base unit with a mobile telephone handset operating on a predetermined wireless protocol wherein said mobile telephone handset operates to enable the use of said base unit as a wireless desktop interface when said mobile telephone handset interfaces with said base unit, the method comprising:

detecting the presence of a handset at said base unit;

transferring user definable data entry key settings of said handset to said base unit;

storing said user definable data entry key settings of said handset at said base unit;

controlling said user definable data entry key settings and data entry keys of said base unit to receive incoming and make outgoing calls from said base unit via said mobile telephone handset and said predetermined wireless protocol.

Conveniently, the base unit and the mobile telephone handset can interface through one of various means, including infrared and radio frequency signalling, and serial connection.

In one embodiment, the base unit beneficially includes a built-in handset charger and a connection to a power source.

In another embodiment, the base unit comprises a LCD display, keypad, handsfree speakerphone, dialing pad, and softkeys.

Similar references are used in different figures to denote similar components.

Figure 1A:
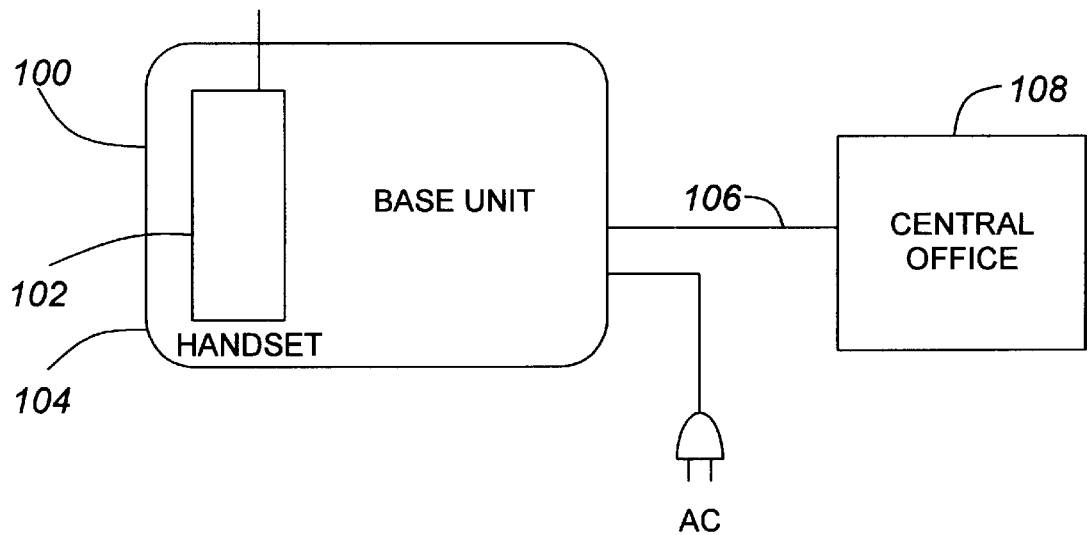
FIG. 1a diagramatically illustrates a prior art base unit for use with a wireless handset.

DETAILED DESCRIPTION OF THE INVENTION:

Referring now to FIG. 1a, we have diagramatically shown the configuration of a prior art cordless telephone 100 comprised of a cordless handset 102 and a base unit 104. Typically, these telephones are used in residential applications wherein the base unit which is powered by an AC source is connected to the telephone network by means of an RJ-11 jack and standard copper wire pair. In FIG. 1a, the copper wire pair 106 provides access to the telephone network via a central office 108. In operation, the handset 102 communicates with the base unit 104 using an RF link such as FM. The base unit 104 in effect is used as a network interface between the handset user and the telephone network.

Recently, cordless telephones have been deployed in business environments wherein the handset user is free to roam the business premises while remaining connected to the telephone network using multiple base stations. These base stations are normally attached to the ceiling throughout the premises. For example, such a business cordless telephone is the COMPANION Wireless Communication System available from Northern Telecom Limited.

Another type of wireless telephone that has been deployed recently operates as a cordless telephone near its base unit and as a cellular telephone when out of range of the base unit. For example, with reference to FIG. 1a, the cordless handset 102 functions in a standard cellular protocol when outside the range of the base unit 104. However, when within the range of the base unit 104, the handset 102 operates as a regular cordless handset, such that the handset 102 communicates first with the base unit 104 via an RF link and then with the telephone network.

More advanced base units may provide additional features more commonly found on desktop telephones but which are not necessarily provided at the handset for example, call display, conference call, etc. With most of these advanced cordless telephones, the base unit 104 can be utilized to make a call or answer an incoming call regardless of whether or not the handset 102 is cradled on the base unit 104, as well as regardless of whether or not the handset 102 is within the cordless range of the base unit 104. However, as indicated previously, these calls are set-up via the wireline network when originating from the base unit.

Figure 1B:
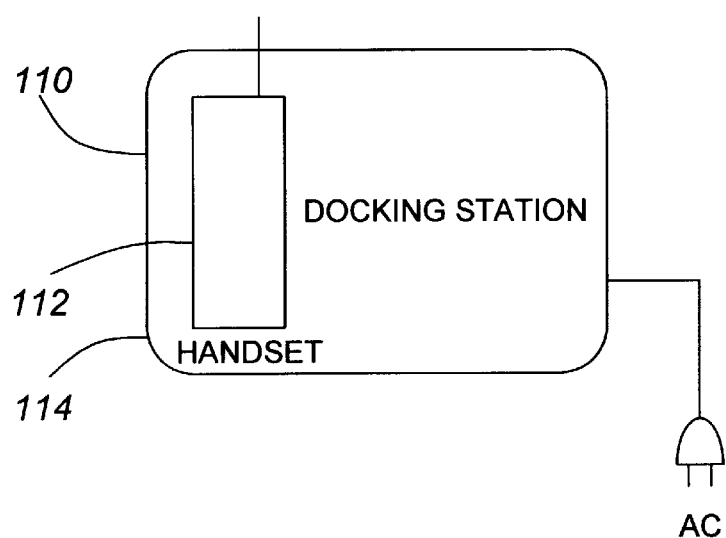
FIG. 1b diagramatically illustrates an embodiment of the current invention wherein communication between the base unit and the telephone network is achieved via the handset's communication protocol.

Referring now to FIG. 1b, we have shown a diagrammatical representation of an embodiment of the present invention. In FIG. 1b, the telephone apparatus 110 is comprised of a wireless telephone handset 112 and a base unit 114. The base unit 114 operates as a desktop docking station which is designed to interface with the handset 112. However, unlike the prior art, the base unit 114 is connected to the telephone network via the handset's wireless interface as opposed to establishing a connection via the wireline network. Thus, with the present embodiment, the base unit 114 remains inactive until the time at which a wireless handset 112 is docked with the base unit 114. At that time, the base unit 114 becomes operational and enables the user to receive or make calls from the base unit 114 via the wireless handset's communication protocol. As will be described further below, once the handset 112 is docked with the base unit 114, the base unit 114 is able to emulate the user definable data entry keys found on the handset 112.

While the base unit 114 is illustrated as utilizing an AC power source, the base unit may also operate solely from a battery source. The AC power source may be used for the purposes of charging a battery operated base unit 114 and the handset 112.

The handset 112 in FIG. 1b operates using its wireless protocol even while docked to the base unit 114. Thus, when the handset 112 interfaces with the base unit 114, the base unit is able to operate as a wireless desktop interface. As will be explained further below, user definable data entry keys of the handset 112 can be emulated at the base unit 114 once the handset 112 is docked to the base unit 114.

Although the preferred embodiment of the base unit makes use of a handset cradle with a serial port to interface with the mobile handset, other interfaces can also be used. For example, the transfer of the user definable data entry key settings from the handset 112 to the base unit 114 can be done using a serial interface as shown in FIG. 2a, an RF interface as shown in FIG. 2b, or an optical link as shown in FIG. 2c.

Figure 2A:
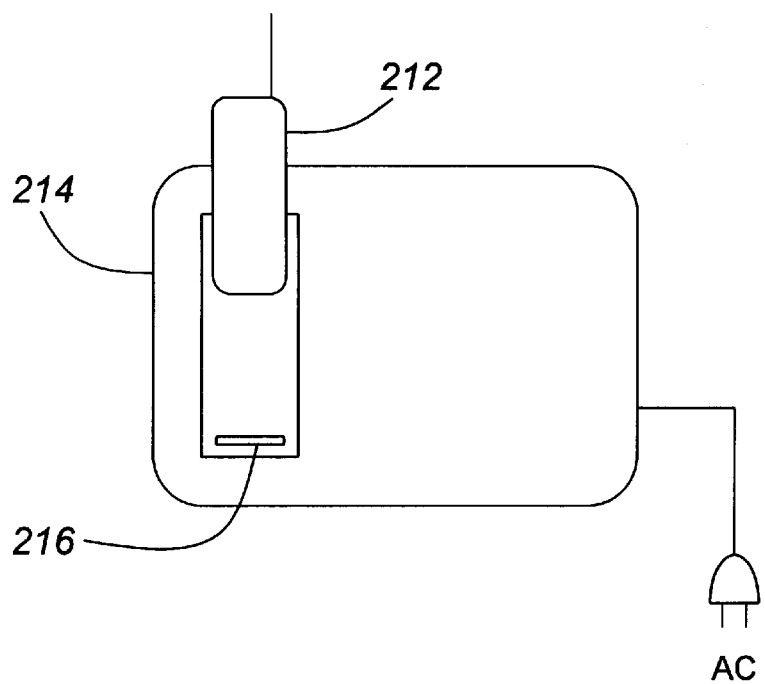
FIG. 2a illustrates an embodiment of the present invention wherein communication between the wireless handset and the base unit is achieved via a serial interface.

With the serial interface of FIG. 2a, the transfer of user definable data entry key settings from the handset 212 to the base unit 214 and the charging of the battery is done via the serial interface 216. The serial interface can be designed to make use of sliding contacts to permit the connection between the handset and the base unit. The transfer of user settings can either be done automatically when the handset 212 is placed in the base cradle of the base unit 214 or upon initialization of a synchronization button or activation of a command by the handset user. The method by which the transfer of user settings is accomplished will be known to those knowledgeable in the art and need not be described herein. A similar transfer of user settings is described in relation to the operation of the Pilot Organizer marketed by Palm Pilot, a division of US Robotics. With this product, synchronization of the user settings is accomplished when the user places the organizer in a cradle serial connected to a PC. If synchronization is to be done automatically, the base unit may also include a simple hook switch for detecting the presence of the handset on the base unit (not shown).

Figure 2B:
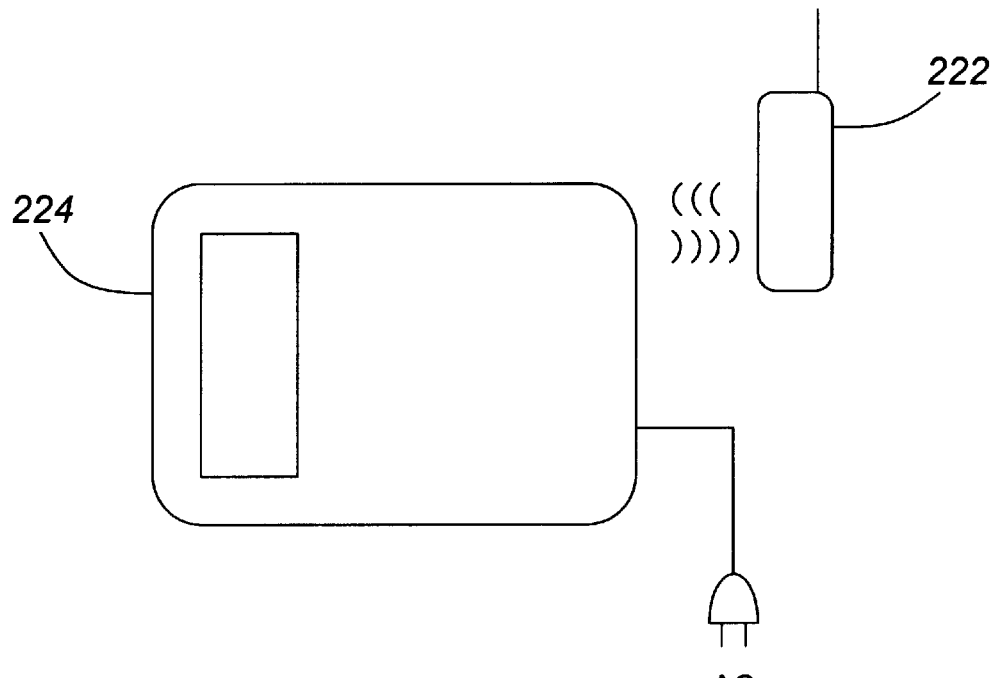
FIG. 2b illustrates an embodiment of the present invention wherein communication between the wireless handset and the base unit is achieved via an RF interface.

With the RF interface of FIG. 2b, the transfer of user settings from the handset 222 to the base unit 224 can be done by means of a suitable RF link without requiring the placement of the handset 222 onto the cradle of the base unit 224. The RF link interface may be achieved by means of a built-in antenna, or other suitable means, which will not interfere with the communication of the handset 222 over the wireless protocol. The base unit may also include a magnetic field detector for detecting the presence of the handset when an RF link will be used for interfacing (not shown).

Figure 2C:
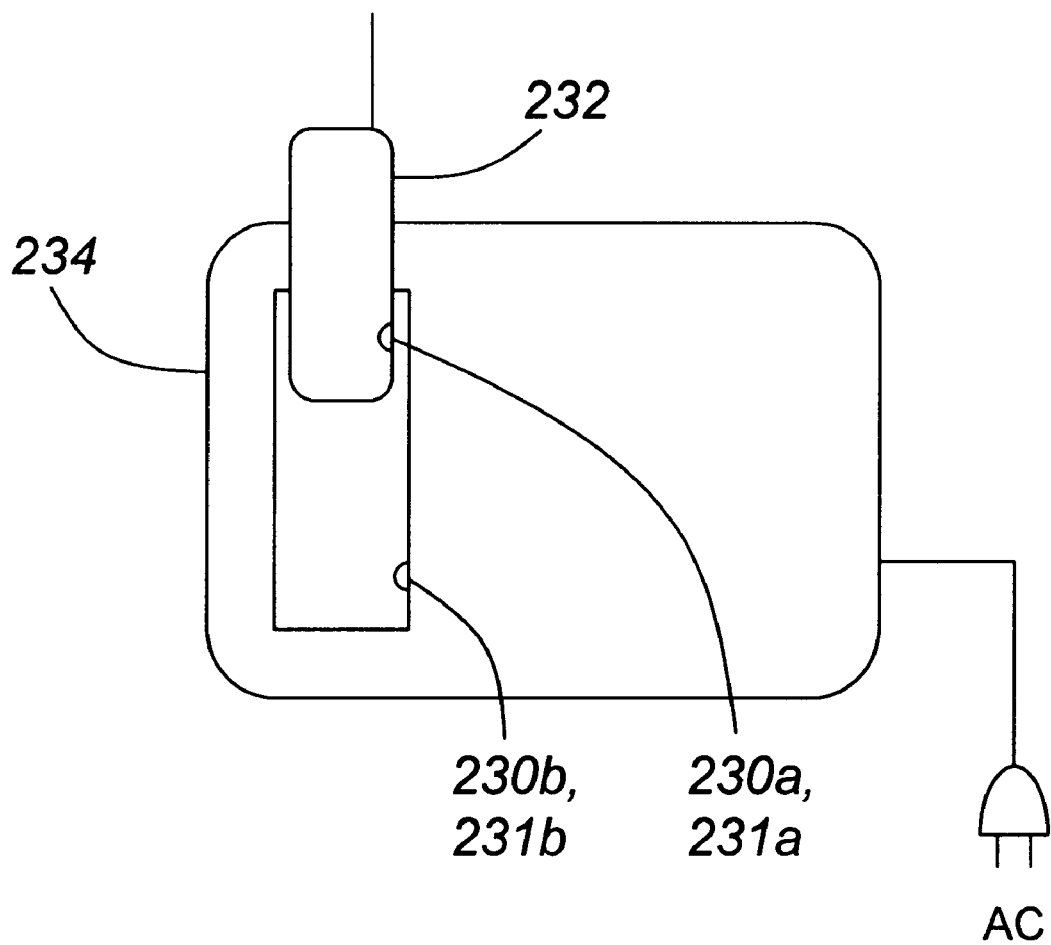
FIG. 2c illustrates an embodiment of the present invention wherein communication between the wireless handset and the base unit is achieved via an optical link.

Similarly, an optical link interface can be accomplished as shown in FIG. 2c by means of an infrared emitter 230a, 230b and receiver 231a, 231b on each of the handset 232 and base unit 234. In this case, the base unit may include an infrared signal detector for detecting the presence of a handset when an IR link can be achieved (not shown).

Figure 3:
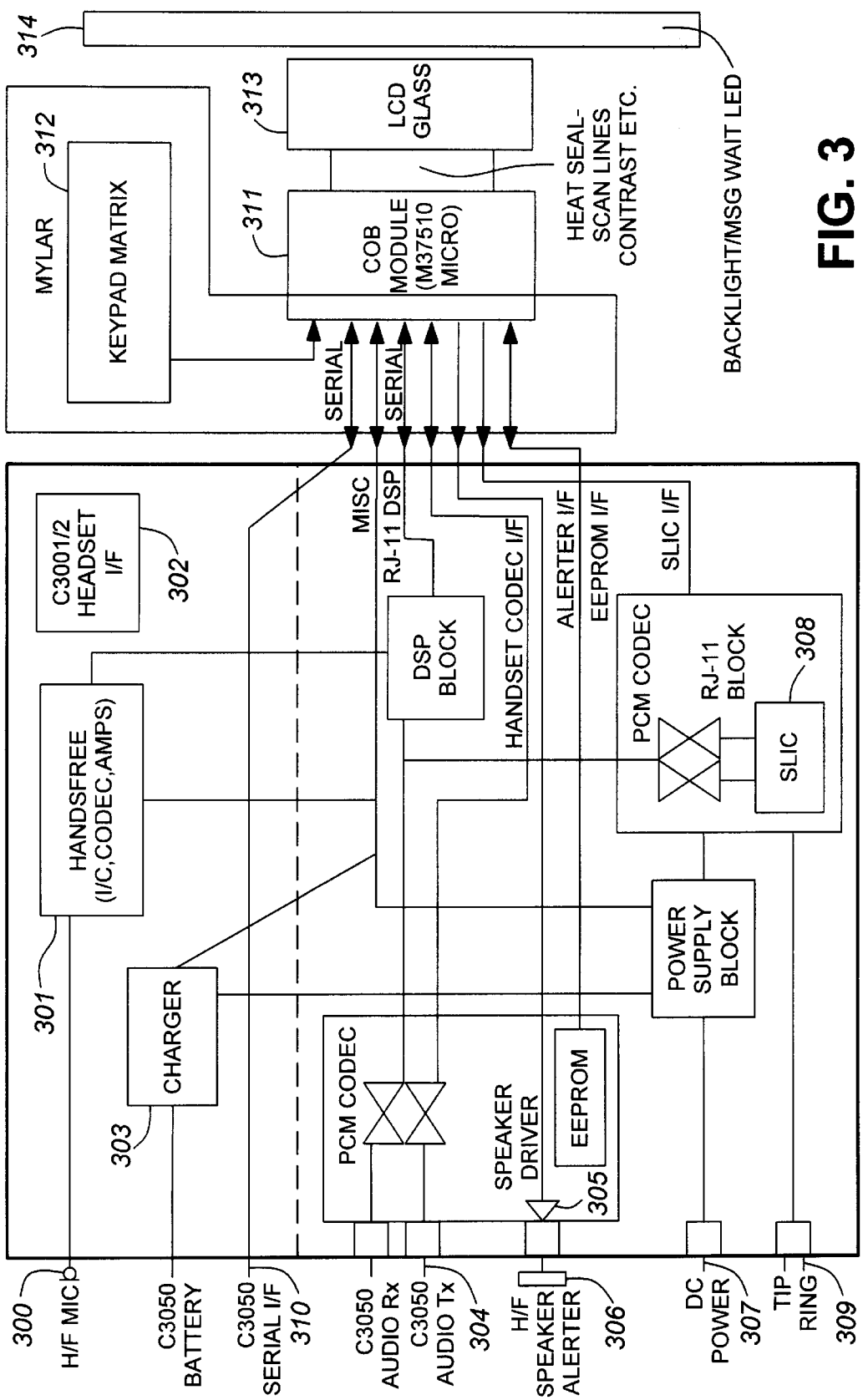
FIG. 3 is a block diagram representing the key elements of a desktop docking station with a subscriber line interface card.

Referring now to FIG. 3, we have shown a block diagram representing the key elements of a desktop docking station for use with a wireless handset. The block diagram of FIG. 3 makes use of a subscriber line interface card to enable the connection of an external wireline telephone set. This enables a user to communicate with the network via a wireless interface but using a wireline telephone.

The base unit comprises the basic elements of an advanced base unit including a handsfree microphone 300 and associated circuitry 301 including a codec and an amplifier. A headset interface 302 may also be provided. If the base unit is to operate on AC, a battery charger circuit 303 may be provided. An audio circuit 304 for enabling audio transmit and receive is provided as well. A driver circuit 305 to enable a ring alerter 306 is also provided. DC power 307 to the base unit can be provided via a standard AC/DC adapter (not shown). The subscriber line interface card (SLIC) is shown at reference numeral 308. An RJ-11 jack 309 connected to the SLIC would also be provided to enable connection of a wireline telephone set (not shown).

The embodiment of FIG. 3 makes use of a serial interface 310 to enable the transfer of user settings from the wireless handset to the base unit. These settings are transferred to a memory of microprocessor 311 which enables the operation of the base unit as well as enabling the emulation of the user settings at the base unit. The keypad matrix 312 and LCD display 313 provide the user interface for the base unit. A message waiting LED 314 may also be provided to indicate that a message has been received and stored. The keypad matrix 312 may be replaced by a large LCD screen with temporarilly definable user response and data entry keys.

For the purposes of user privacy, the embodiment of FIG. 3 can also include a reset key (not shown) for resetting the base unit memory after a user has downloaded data to it. This is particularly useful for those base units which are located in public places and are easily accessible by other users.

Figure 4:
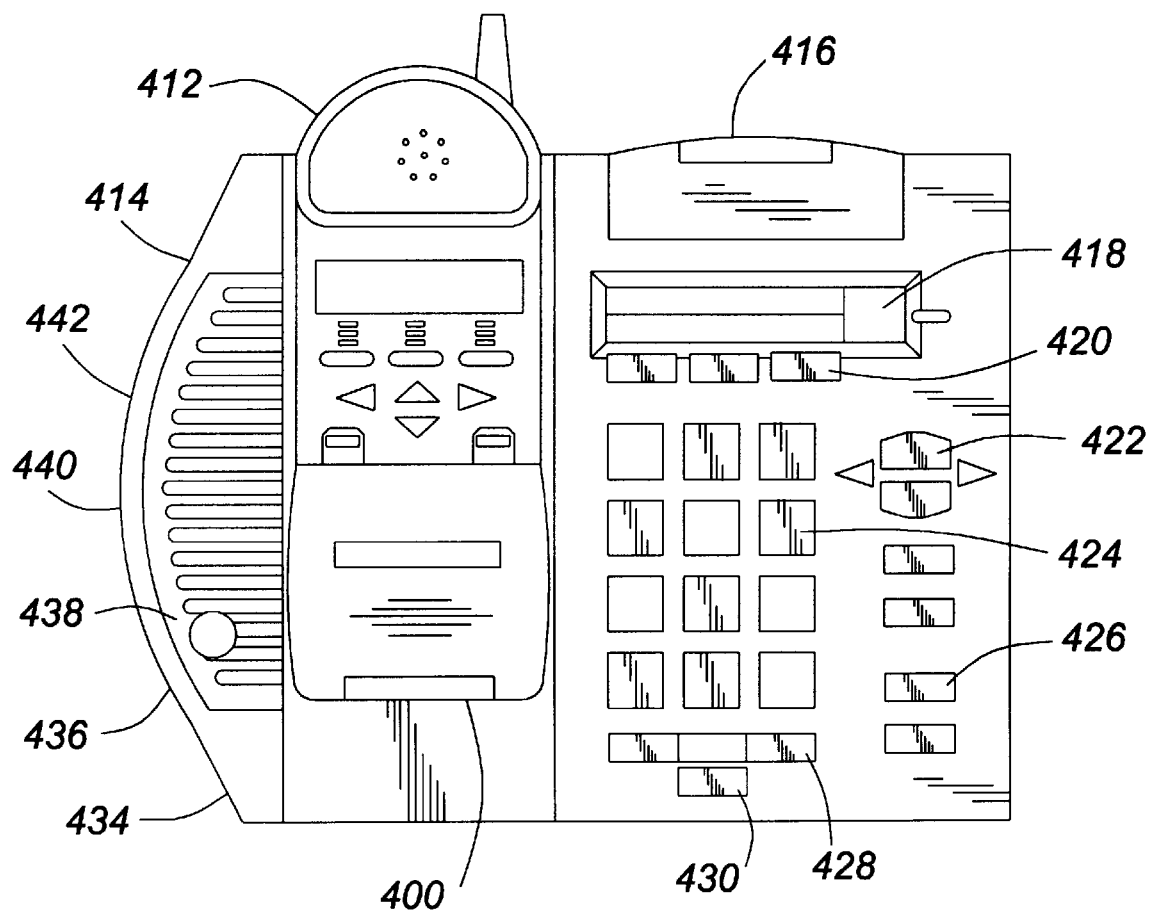
FIG. 4 illustrates a desktop docking station for use with a wireless handset in accordance with an embodiment of the present invention.

Referring now to FIG. 4, we have shown a wireless docking station according to a preferred embodiment of the invention. In this embodiment, a serial interface 400 is used to transfer user settings from the wireless handset 412 to the base unit 414 as well as to enable the communication interface from the base unit 414 to the telephone network via the wireless handset 412. The base unit 414 includes a message waiting light 416, large backlight display 418, softkeys 420, navigation keys 422, standard dialpad 424, end key 426, volume control 428, and mute key 430. The base unit 414 further comprises serial interfacing means 400 in the cradle for the base unit 414, a headset jack 434, a voice/fax RJ-11 jack 436, a handsfree speakerphone with LED indicator 438, a spare battery holder and charger 440, and a built-in handset charger 442.

When the handset 412 is placed in the cradle of the base unit 414, the base unit 414 detects the presence of the handset 412 and the base unit 414 and the handset 412 are able to interface via the serial interface 400. Accordingly when the user is dialing using the desktop keypad 424, the communication link is established via the cradled handset 412. The interfacing allows the base unit 414 to emulate the keypad 424 of the handset 412. Obviously, the user could also use the handset keypad to initiate the call.

The ability to bring the desktop base unit 414 "alive" allows the user to benefit from the added features provided by desktop telephones which are often not provided by standard wireless handsets. For example, the user may benefit greatly from the ability to use call display, the handsfree speakerphone 438 for a conference call, or the message waiting light 416 for convenience.

If the interface used is an RF interface, placement of the handset in the base unit cradle is not required. In this case, when the handset 412 is placed within sufficient proximity to the RF interface (not shown) of the base unit, the base unit 414 detects the presence of the handset 412, and the base unit 414 and the handset 412 are able to interface via the RF interface. Accordingly when the user is dialing using the desktop keypad 424, the communication link is established as with the serial interface via the handset 412. Similarly, the interfacing allows the base unit 414 to emulate the keypad 424 of the handset 412.

What is claimed is:

1. A telephone base unit for use with a mobile telephone handset, said telephone base unit having a user interface with data entry keys, said base unit comprising:

means for interfacing said handset with said base unit for enabling user definable data entry key settings of said handset to be downloaded and emulated at said base unit such that when interfaced with said base unit, said mobile telephone handset operates to enable the use of said base unit as a wireless desktop interface, wherein said means for interfacing said handset with said base unit comprises:
means for transferring said user definable data entry key settings of said handset to said base unit;
means for storing said user definable data entry key settings of said handset at said base unit; and
controller means to enable a user to use said user definable data entry key settings with said user interface of said base unit to receive incoming and make outgoing calls from said base unit via said mobile telephone handset.

2. A telephone base unit as described in claim 1, wherein said means for interfacing further comprises means for detecting the presence of said handset at said base unit.

3. A telephone base unit as described in claim 2, wherein said means for detecting the presence of said handset at said base unit comprises one of an infrared, radio frequency, current or voltage detector.

4. A telephone base unit as described in claim 1, wherein said means for transferring comprises an infrared signal emitter and receiver at said handset and said base unit.

5. A telephone base unit as described in claim 1, wherein said means for transferring comprises a radio frequency transmitter and receiver at said handset and said base unit.

6. A telephone base unit as described in claim 1, wherein said means for transferring comprises a serial interface.

7. A telephone base unit as described in claim 1, wherein said user interface comprises a display with temporarilly definable response and data entry keys.

8. A telephone base unit as described in claim 1, wherein said user definable data entry key settings of said mobile handset are emulated at user data entry keys of said user interface.

9. A telephone base unit for use with a mobile telephone handset operating on a predetermined wireless protocol, wherein said mobile telephone handset operates to enable the use of said base unit as a wireless desktop interface when said mobile telephone handset interfaces with said base unit, comprising:
   means for detecting the presence of a handset at said base unit; and
   means for interfacing said handset with said base unit such that user definable data entry key settings of said handset can be emulated at data entry keys of said base unit,
   wherein said means for interfacing said handset with said base unit comprises:
      means for transferring said user definable data entry key settings of said handset to said base unit;
      means for storing said user definable data entry key settings of said handset at said base unit; and
      controller means to enable a user to use said user definable data entry key settings at data entry keys of said base unit to receive incoming and make outgoing calls from said base unit via said mobile telephone handset and said predetermined wireless protocol.

10. A telephone base unit as described in claim 9, wherein said means for transferring said user definable data entry key settings comprises an infrared signal emitter and receiver at said handset and said base unit.

11. A telephone base unit as described in claim 9, wherein said means for transferring comprises a radio frequency transmitter and receiver at said handset and said base unit.

12. A telephone base unit as described in claim 9, wherein said means for transferring comprises a serial interface.

13. A telephone base unit as described in claim 9, wherein said means for detecting the presence of said handset at said base unit comprises one of an infrared, radio frequency, current or voltage detector.

14. A telephone apparatus comprising a base unit and a mobile telephone handset wherein said mobile telephone handset operates to enable the use of said base unit as a wireless desktop interface when said mobile telephone handset interfaces with said base unit and said base unit comprises:
   means for detecting the presence of a handset at said base unit; and
   means for interfacing said handset at said base unit such that user definable data entry key settings of said handset can be emulated at data entry keys of said base unit,
   wherein said means for interfacing said handset with said base unit comprises:
      means for transferring said user definable data entry key settings of said handset to said base unit;
      means for storing said user definable data entry key settings of said handset at said base unit; and
      controller means to enable a user to use said user definable data entry key settings at data entry keys of said base unit to receive incoming and make outgoing calls from said base unit.

15. A telephone apparatus as described in claim 14, wherein said means for transferring comprises an infrared signal emitter and receiver at said handset and said base unit.

16. A telephone apparatus as described in claim 14, wherein said means for transferring comprises a radio frequency transmitter and receiver at said handset and said base unit.

17. A telephone apparatus as described in claim 14, wherein said means for transferring comprises a serial interface.

18. A telephone apparatus as described in claim 14, wherein said means for detecting the presence of said handset at said base unit comprises one of an infrared, radio frequency, current or voltage detector.

19. A method of interfacing a telephone base unit with a mobile telephone handset operating on a predetermined wireless protocol wherein said mobile telephone handset operates to enable the use of said base unit as a wireless desktop interface when said mobile telephone handset interfaces with said base unit, the method comprising:
   detecting the presence of a handset at said base unit;
   transferring user definable data entry key settings of said handset to said base unit;
   storing said user definable data entry key settings of said handset at said base unit;
   controlling said user definable data entry key settings and data entry keys of said base unit to receive incoming and make outgoing calls from said base unit via said mobile telephone handset and said predetermined wireless protocol.

20. A method as described in claim 19, wherein said user definable data entry key settings are transferred using an infrared link.

21. A method as described in claim 19, wherein said user definable data entry key settings are transferred using a radio frequency link.

22. A method as described in claim 19, wherein said user definable data entry key settings are transferred using a serial interface.

* * * * *